(12) United States Patent
Hirai (10) Patent No.: US 8,860,845 B2
(45) Date of Patent: Oct. 14, 2014

(54) IMAGING APPARATUS AND IMAGING METHOD

(75) Inventor: Yukio Hirai, Akashi (JP)

(73) Assignee: Fujitsu Limited, Kawasaki (JP)

( * ) Notice: Subject to any disclaimer, the term of this patent is extended or adjusted under 35 U.S.C. 154(b) by 35 days.

(21) Appl. No.: 13/614,198

(22) Filed: Sep. 13, 2012

(65) Prior Publication Data
US 2013/0002893 A1    Jan. 3, 2013

Related U.S. Application Data

(63) Continuation of application No. PCT/JP2010/057103, filed on Apr. 21, 2010.

(51) Int. Cl.
| | | |
|---|---|---|
| H04N 5/225 | (2006.01) | |
| G02B 26/00 | (2006.01) | |
| G02B 27/00 | (2006.01) | |
| H04N 5/232 | (2006.01) | |
| H04N 5/217 | (2011.01) | |

(52) U.S. Cl.
CPC ............ *H04N 5/217* (2013.01); *G02B 27/0075* (2013.01); *H04N 5/23229* (2013.01); *G02B 2207/125* (2013.01)
USPC .......................................... 348/237; 359/237

(58) Field of Classification Search
USPC ............................ 348/335, 340, 342; 359/237
See application file for complete search history.

(56) References Cited

U.S. PATENT DOCUMENTS

| | | | |
|---|---|---|---|
| 2007/0076296 A1* | 4/2007 | Dowski, Jr. .................. 359/558 |
| 2007/0122049 A1* | 5/2007 | Dowski et al. ................ 382/254 |
| 2007/0258706 A1* | 11/2007 | Raskar et al. .................... 396/52 |
| 2007/0268376 A1* | 11/2007 | Yoshikawa et al. ......... 348/222.1 |
| 2008/0131023 A1* | 6/2008 | Dowski et al. ................ 382/279 |
| 2008/0187305 A1* | 8/2008 | Raskar et al. ................. 396/268 |
| 2009/0095912 A1* | 4/2009 | Slinger et al. ............ 250/363.06 |
| 2010/0214438 A1* | 8/2010 | Hayashi et al. ............. 348/229.1 |
| 2010/0215219 A1* | 8/2010 | Chang et al. .................. 382/106 |
| 2011/0043666 A1* | 2/2011 | Mitsumoto ................... 348/241 |
| 2011/0310226 A1* | 12/2011 | McEldowney ................. 348/46 |
| 2012/0113287 A1* | 5/2012 | Johnson et al. ............ 348/222.1 |
| 2013/0222624 A1* | 8/2013 | Kane et al. .................. 348/208.4 |

FOREIGN PATENT DOCUMENTS

| | | |
|---|---|---|
| JP | 2003-235794 | 8/2003 |
| JP | 2008-109542 | 5/2008 |
| JP | 2008-245157 | 10/2008 |
| JP | 2008245157 A * | 10/2008 |
| JP | 2010-85487 | 4/2010 |

OTHER PUBLICATIONS

International Search Report of PCT/JP2010/057103 mailed Jun. 1, 2010.
Written Opinion of the International Searching Authority of PCT/JP2010/057103 mailed Jun. 1, 2010.

(Continued)

*Primary Examiner* — Timothy J Henn (74) *Attorney, Agent, or Firm* — Staas & Halsey LLP (57) ABSTRACT

An imaging apparatus includes an optical wavefront coding element that performs a dispersion of a light flux emitted from a subject into three or more directions, an imaging element that receives the light flux dispersed by the optical wavefront coding element to acquire a subject preimage, and a generation unit that generates an image of the subject by applying a process corresponding to the dispersion to the subject preimage.

6 Claims, 12 Drawing Sheets

(56) References Cited

OTHER PUBLICATIONS

Shin'ichi Komatsu, "The Latest Trend of Multifunctional Imaging Technologies and Their Applications", The Journal of the Institute of the Image Information and Television Engineers, Mar. 1, 2009, vol. 63, No. 3, pp. 279-283.

Edward R. Dowski et al., "Extended depth of field through wavefront coding", Applied Optics, Apr. 10, 1995, vol. 34, No. 11, pp. 1859-1866.

Japanese Office Action mailed Dec. 11, 2012 in corresponding Japanese Application No. 2012-511454.

Japanese Office Action mailed Aug. 27, 2013 in corresponding Japanese Application No. 2012-511454.

* cited by examiner

IMAGING APPARATUS AND IMAGING METHOD

CROSS-REFERENCE TO RELATED APPLICATION

This application is a continuation application of International Application PCT/JP2010/057103, filed on Apr. 21, 2010, and designating the U.S., the entire contents of which are incorporated herein by reference.

FIELD

The embodiments discussed herein are directed to an imaging apparatus and an imaging method.

BACKGROUND

In general, an imaging apparatus such as a digital camera or a camera mounted on a mobile phone performs an imaging process by forming an image of a subject on a two-dimensional imaging element such as a charge coupled device (CCD) or a complementary metal oxide semiconductor (CMOS). Recently, in some cases, a technique called wavefront coding (WFC) has been employed in the imaging apparatus.

Figure 10:
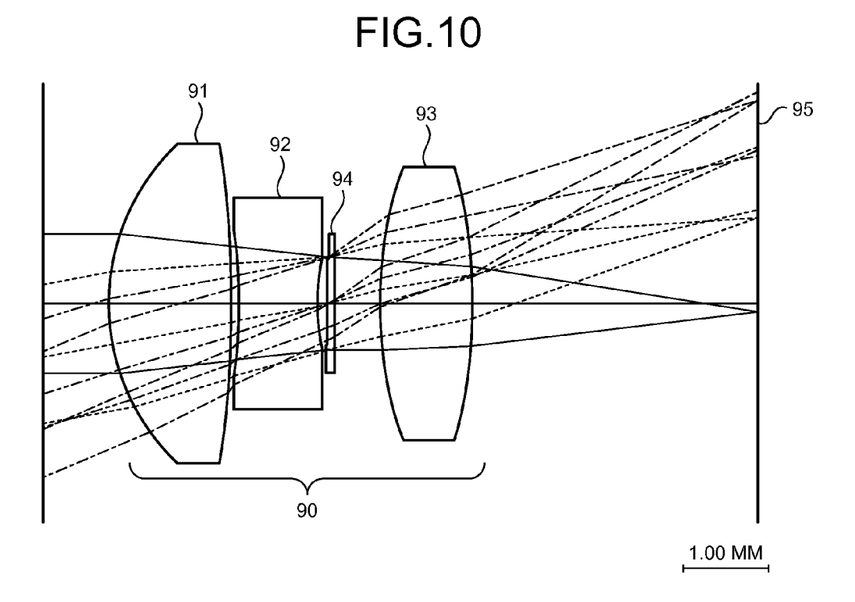
FIG. 10 is a schematic diagram illustrating an optical system of an imaging apparatus in the related art employing a WFC technique.

Now, an imaging apparatus employing the WFC technique will be described with reference to FIG. 10. FIG. 10 is a schematic diagram illustrating an optical system of the imaging apparatus employing the WFC technique in the related art. As illustrated in FIG. 10, the imaging apparatus in the related art includes an optical system 90 and an imaging element 95. Lenses 91 to 93 and a phase plate 94 which is an optical wavefront coding element are disposed in the optical system 90.

In the example illustrated FIG. 10, in the case where there is no phase plate 94, the lenses 91 to 93 allows the light emitted from the subject which is to be imaged to converge. On the other hand, as illustrated in the example of FIG. 10, the phase plate 94 is disposed, so that the phase plate 94 regularly disperses the light flux emitted from the subject which is to be imaged to deform the image formed on the light receiving surface of the imaging element 95. Therefore, the imaging element 95 obtains an image (hereinafter, referred to as an "intermediate image") in the state where a focus thereof is deviated. Next, the imaging apparatus applies a digital process such as an inverse filter to the intermediate image formed by the imaging element 95 to generate an image of the subject.

In the case where relative positions between the imaging apparatus and the subject are changed, the intermediate image obtained by the imaging apparatus employing the WFC technique has a small amount of change in blur degree. For example, the intermediate image in the case where the distance between the imaging apparatus and the subject is H1 and the intermediate image in the case where the distance between the imaging apparatus and the subject is H2 (>H1) have a small amount of change in blur degree. The imaging apparatus employing the WFC technique generates the subject image by applying a digital process to the intermediate image having a small amount of change in blur degree, so that it is possible to increase the depth of field.

Patent Literature 1: Japanese Laid-open Patent Publication No. 2008-109542
Patent Literature 2: Japanese Laid-open Patent Publication No. 2003-235794
Non-Patent Literature 1: Edward R. Dowski, Jr. and W. Thomas Cathey, "Extended depth of field through wave-front coding", *Applied Optics*, vol. 34, no 11, pp. 1859-1866, April, 1995.

SUMMARY

According to an aspect of an embodiment, a imaging apparatus includes an optical wavefront coding element that performs a dispersion of a light flux emitted from a subject into three or more directions, an imaging element that receives the light flux dispersed by the optical wavefront coding element to acquire a subject preimage, and a generation unit that generates an image of the subject by applying a process corresponding to the dispersion to the subject preimage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 11:
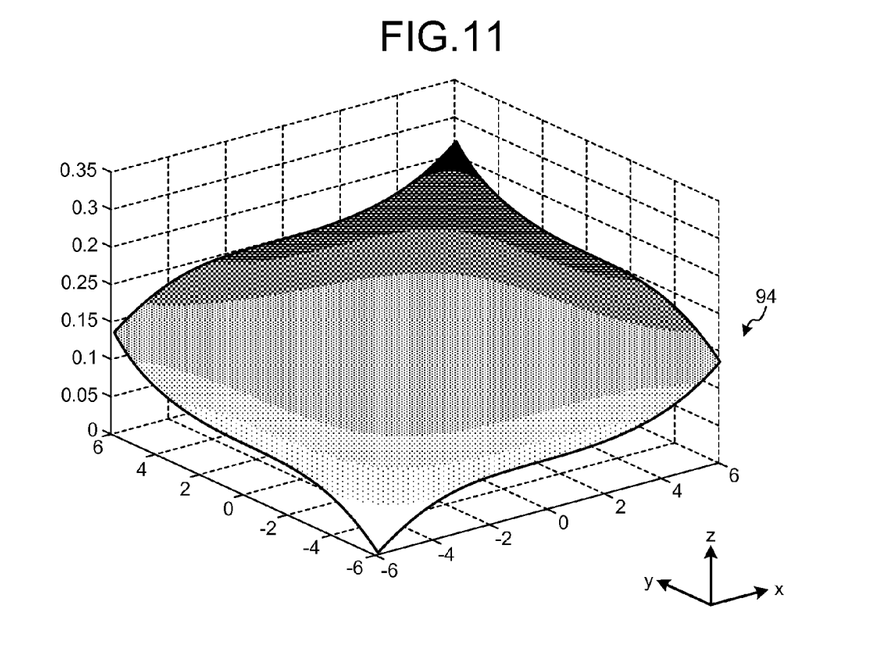
FIG. 11 is a diagram illustrating an example of a shape of a phase plate in the related art illustrated in FIG. 10.
Figure 12:
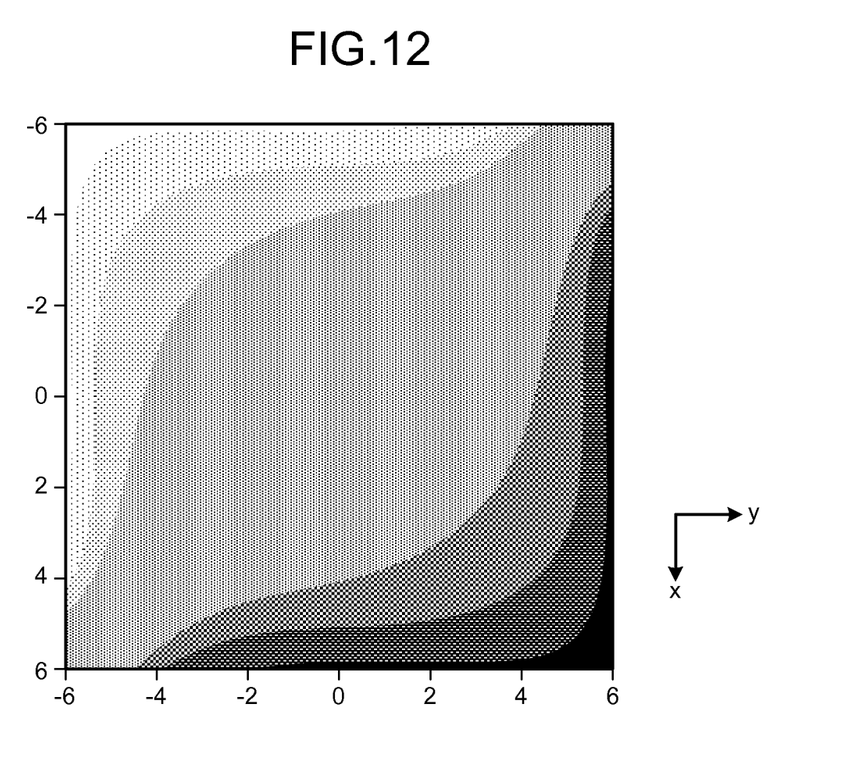
FIG. 12 is a diagram illustrating an example of a shape of a phase plate in the related art illustrated in FIG. 10.

Now, in the related art described above, there is a problem in that a subject image is not generated at high accuracy. The problem will be described in detail with reference to FIGS. 11 to 15. FIGS. 11 and 12 are diagrams illustrating an example of a shape of the phase plate 94 in the related art illustrated in FIG. 10. In addition, FIG. 12 illustrates the shape of the phase plate 94 as seen from the Z axis direction of FIG. 11. Generally, in the imaging apparatus employing the WFC technique in the related art, the phase plate 94 having a shape exemplified in FIGS. 11 *and* 12 is used. The shape of the phase plate 94 in the related art is expressed, for example, by the following Equation (1).

$$z = A(x^3 + y^3) \quad (1)$$

In the above Equation (1), "A" indicates an arbitrary coefficient. The phase plate 94 having the shape expressed by the above Equation (1) has a phase distribution which is perpendicular to the X and Y axis directions. More specifically, the light transmitting through the phase plate 94 is focused on an area, which is mainly perpendicular to the X and Y axis directions, of the light receiving surface of the imaging element 95. The phase distribution of the phase plate 94 is expressed, for example, by the following Equation (2).

$$P(x,y) = \exp(i\alpha(x^3 + y^3)) \quad (2)$$

Figure 13:
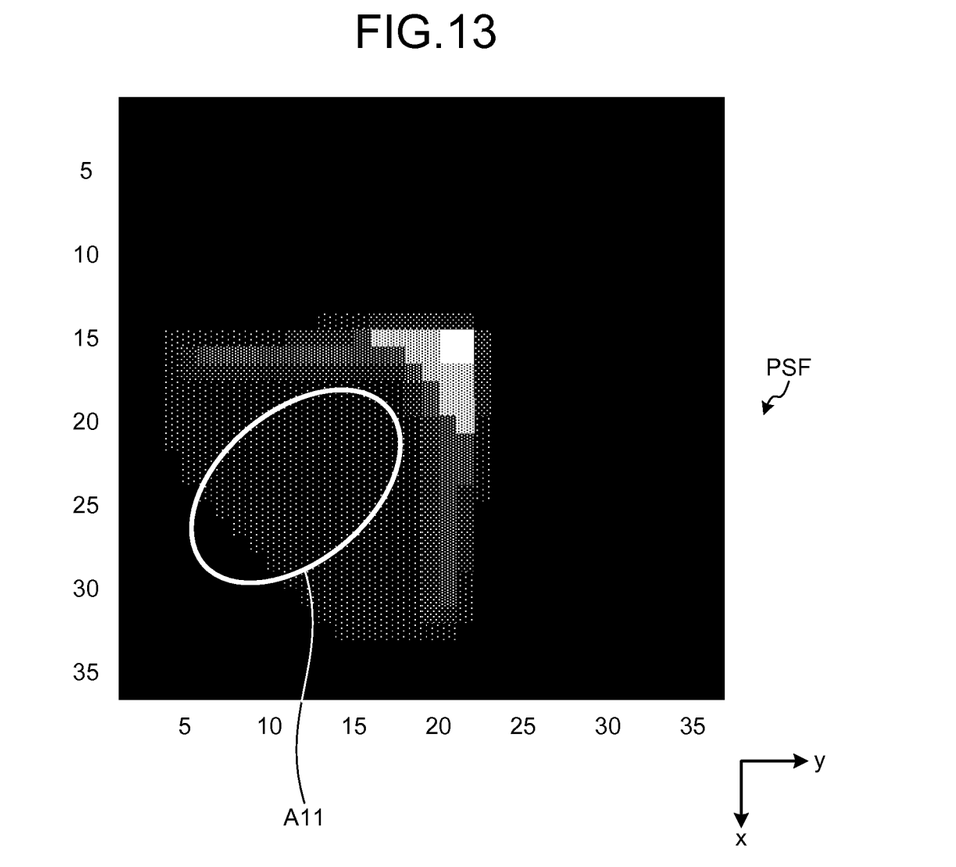
FIG. 13 is a diagram illustrating an example of a PSF of an optical system in the related art.

In other words, as illustrated in the example of FIG. 13, a point spread function (PSF) of the optical system 90 including the phase plate 94 is dispersed into two directions of the X axis direction and the Y axis direction, so that the PSF becomes asymmetric. The imaging apparatus in the related art acquires the intermediate image by using the optical system 90 having the PSF and applies a digital process to the intermediate image to generate the subject image. At this time, since the PSF of the optical system 90 is dispersed into the X and Y axis directions, in some cases, a ghost may occur in the subject image generated by the imaging apparatus in the related art.

This point will be described in detail. First, in the case where the intermediate image, the PSF, and the subject image are denoted by "h", "g", and "f", respectively, the following relational Equation (3) is satisfied with respect to "h", "g", and "f".

$$f * g = h \quad (3)$$

In the above Equation (3), "*" indicates convolution. Next, by performing Fourier transformation on the Equation (3), the following Equation (4) is obtained.

$$F \cdot G = H \quad (4)$$

In the above Equation (4), "G" which is a result of Fourier transformation of a PSF "g" is an optical transfer function (OTF) representing a spatial frequency transfer characteristic of an image formation optical system. In addition, an absolute value of the OTF is called a modulation transfer function (MTF).

In the case where the imaging apparatus in the related art obtains the subject image "f" by applying a digital process to the intermediate image "h", for example, "H" which is a result of Fourier transformation of the intermediate image "h" is multiplied with an inverse filter "$H_{inv}$" of the OTF "G", and a result of the multiplication is inversely Fourier-transformed. More specifically, the imaging apparatus in the related art performs the multiplication expressed by the following Equation (5) to calculate the Fourier-transformed subject image "F". Next, the imaging apparatus in the related art performs inverse Fourier transformation on the subject image "F" to generate the subject image "f". In addition, the inverse filter "$H_{inv}$" expressed in the following Equation (5) is expressed by the following Equation (6).

$$F = H_{inv} \cdot H \quad (5)$$

$$H_{inv} \approx 1/G \quad (6)$$

In addition, the imaging apparatus in the related art may obtain an inverse kernel "$h_{inv}$" by performing inverse Fourier transformation on the inverse filter "$H_{inv}$" and generate the subject image "f". More specifically, as expressed in the following Equation (7), the imaging apparatus in the related art may generate the subject image "f" by performing convolution of the intermediate image "h" and the inverse kernel "$h_{inv}$".

$$f = h * h_{inv} \quad (7)$$

Herein, in the WFC where the phase plate 94 having the shape illustrated in FIGS. 11 and 12 is used, there is a characteristic in that MTF is not "0" until the spatial frequency is in a high frequency band, and a change in MTF is small even in the case where a focus position is changed. However, as illustrated in the example of FIG. 13, the PSF of the optical system 90 in the related art is dispersed into the X and Y axis directions perpendicular to each other. Therefore, in some cases, the absolute value MTF of the OTF "G" calculated by performing Fourier transformation on the PSF "g" may become a value close to "0" in an area between the X and Y axis directions. In the example illustrated in FIG. 13, in some cases, the MTF may become a value close to "0", for example, in the area All between the X and Y axis directions.

Figure 14:
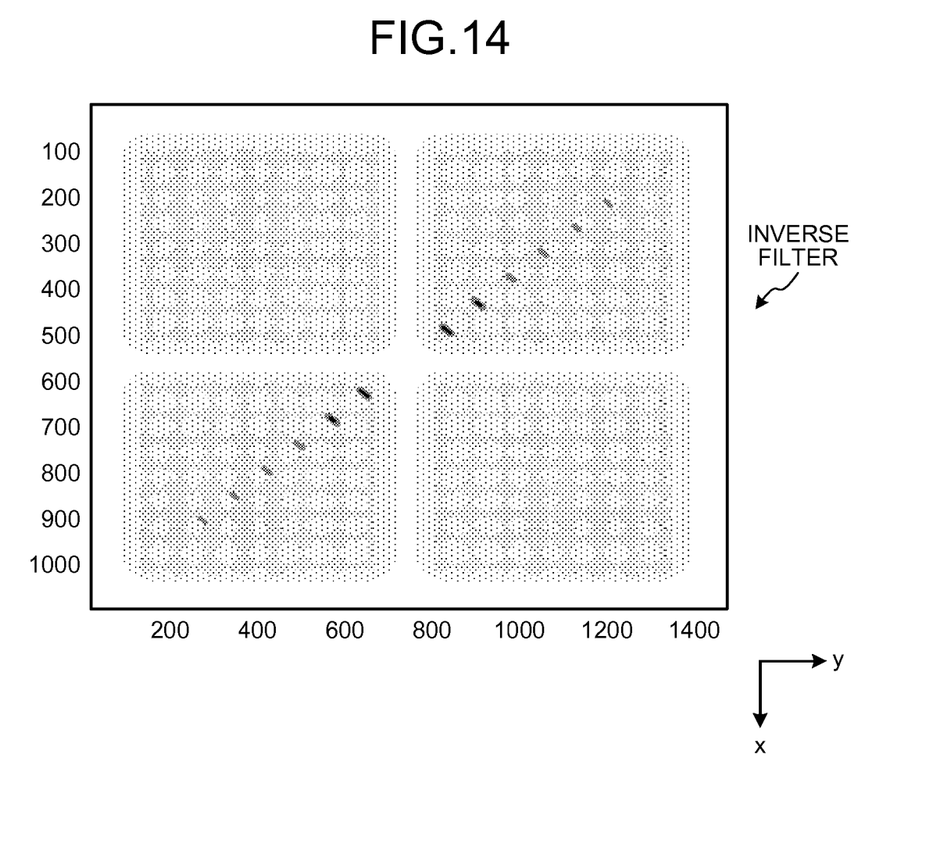
FIG. 14 is a diagram illustrating an example of an inverse filter in the related art.
Figure 15:
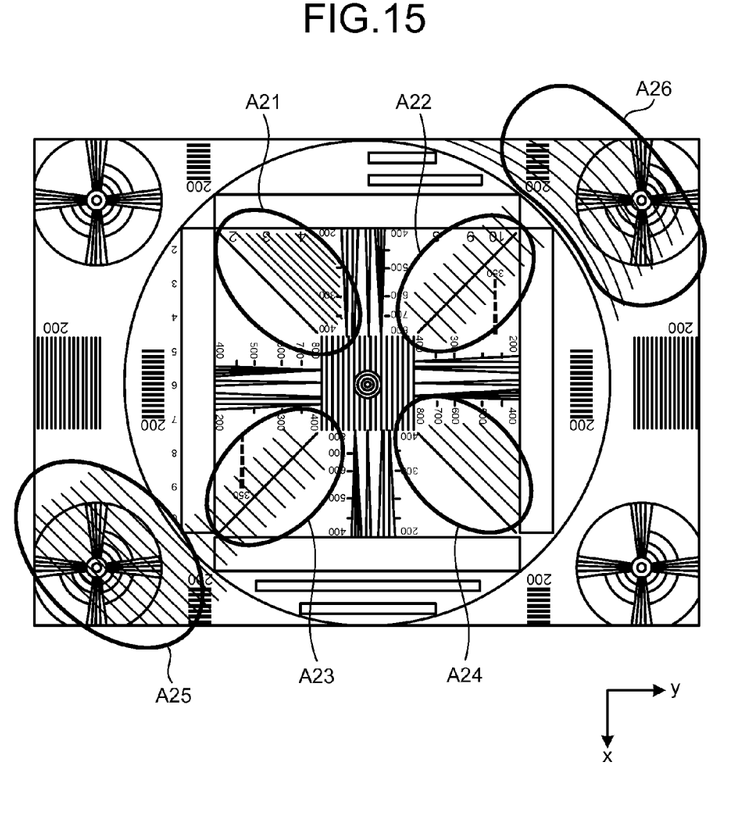
FIG. 15 is a diagram illustrating an example of a subject image in the related art.

Therefore, in some cases, as illustrated in the example of FIG. 14, the inverse filter "$H_{inv}$" expressed by the above Equation (6) may become a large value in an area between the X and Y axis directions. As a result, since the area between the X and Y axis directions is easily affected by noise, in some cases, a ghost may occur in the area between the X and Y axis directions in the subject image "f". FIG. 15 illustrates an example of the subject image generated by using the inverse filter illustrated in FIG. 14. In the example illustrated in FIG. 15, a ghost occurs in the areas A21 to A26 or the like of the subject image.

As described above, in the imaging apparatus employing the WFC technique in the related art, since the PSF of the optical system is dispersed into the two directions, that is, the X and Y axis directions, in some cases, a ghost may occur in the generated subject image. In other words, in the imaging apparatus employing the WFC technique in the related art, in some cases, the subject image is not generated at high accuracy.

Preferred embodiments of the present application will be explained with reference to accompanying drawings. In addition, the present application is not limited to the embodiments of the imaging apparatus and the imaging method described hereinafter.

[a] First Embodiment

Figure 1:
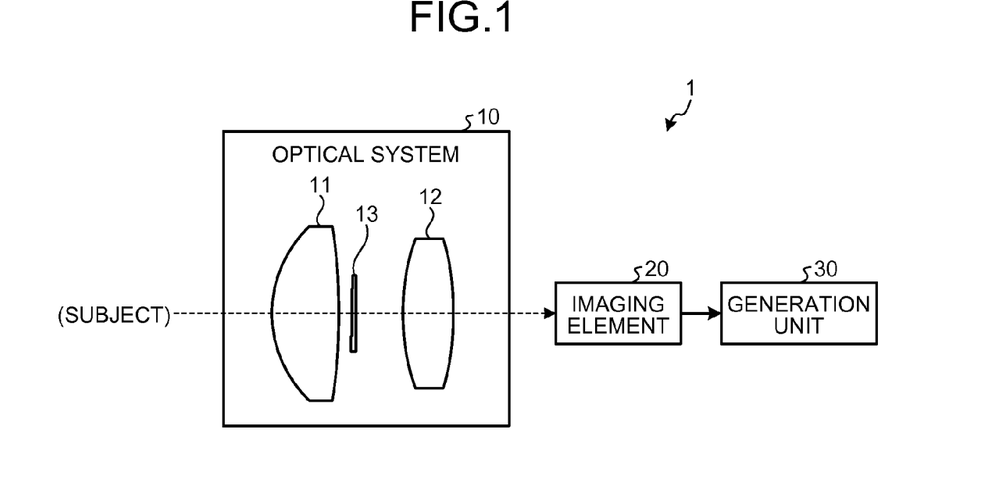
FIG. 1 is a block diagram illustrating an example of a configuration of an imaging apparatus according to a first embodiment.

First, an imaging apparatus according to a first embodiment will be described with reference to FIG. 1. FIG. 1 is a block diagram illustrating an example of a configuration of the imaging apparatus according to the first embodiment. As illustrated in FIG. 1, an imaging apparatus 1 according to the first embodiment includes an optical system 10, an imaging element 20, and a generation unit 30. The optical system 10 allows the light emitted from the subject, which is to be imaged, to be incident on the imaging element 20. More specifically, the optical system 10 includes lenses 11 and 12 and an optical wavefront coding element 13.

The lens 11 refracts the light emitted from the subject. The optical wavefront coding element 13 disperses a light flux of the subject illuminated through the lens 11 into three or more directions and allows the dispersed light flux to be incident through the lens 12 on the imaging element 20. For example, the optical wavefront coding element 13 focuses the light flux of the subject on the area, which is dispersed from an arbitrary position into three or more directions, of the light receiving surface of the imaging element 20.

The imaging element 20 receives the light flux dispersed by the optical wavefront coding element 13 and forms an image. The generation unit 30 applies a digital process to the subject preimage obtained through the image formation of the imaging element 20 to generate a subject image. In other words, the generation unit 30 recovers the subject image from the subject preimage which is the intermediate image.

In this manner, the imaging apparatus 1 according to the first embodiment disperses the light flux emitted from the subject into three or more directions and focuses the dispersed light flux. Therefore, in comparison with the imaging apparatus where the PSF illustrated in FIG. 13 is dispersed into two directions, the imaging apparatus 1 according to the first embodiment has a small area where the MTF becomes a value close to "0" during the digital process. In other words, since the imaging apparatus 1 according to the first embodiment has a small area where the inverse filter "$H_{inv}$" has a large value, it is possible to reduce an area which is affected by noise. As a result, it is possible to prevent a ghost from occurring in the subject image. Accordingly, in the imaging apparatus 1 according to the first embodiment, it is possible to generate the subject image at high accuracy.

[b] Second Embodiment

Next, an example of the imaging apparatus having the PSF which is dispersed into three directions according to the second embodiment will be described. Hereinafter, an example of a configuration of the imaging apparatus according to the second embodiment, a characteristic of depth of field of the imaging apparatus according to the second embodiment, and a procedure of an imaging process of the imaging apparatus according to the second embodiment will be sequentially described.

Configuration of Imaging Apparatus According to Second Embodiment

Figure 2:
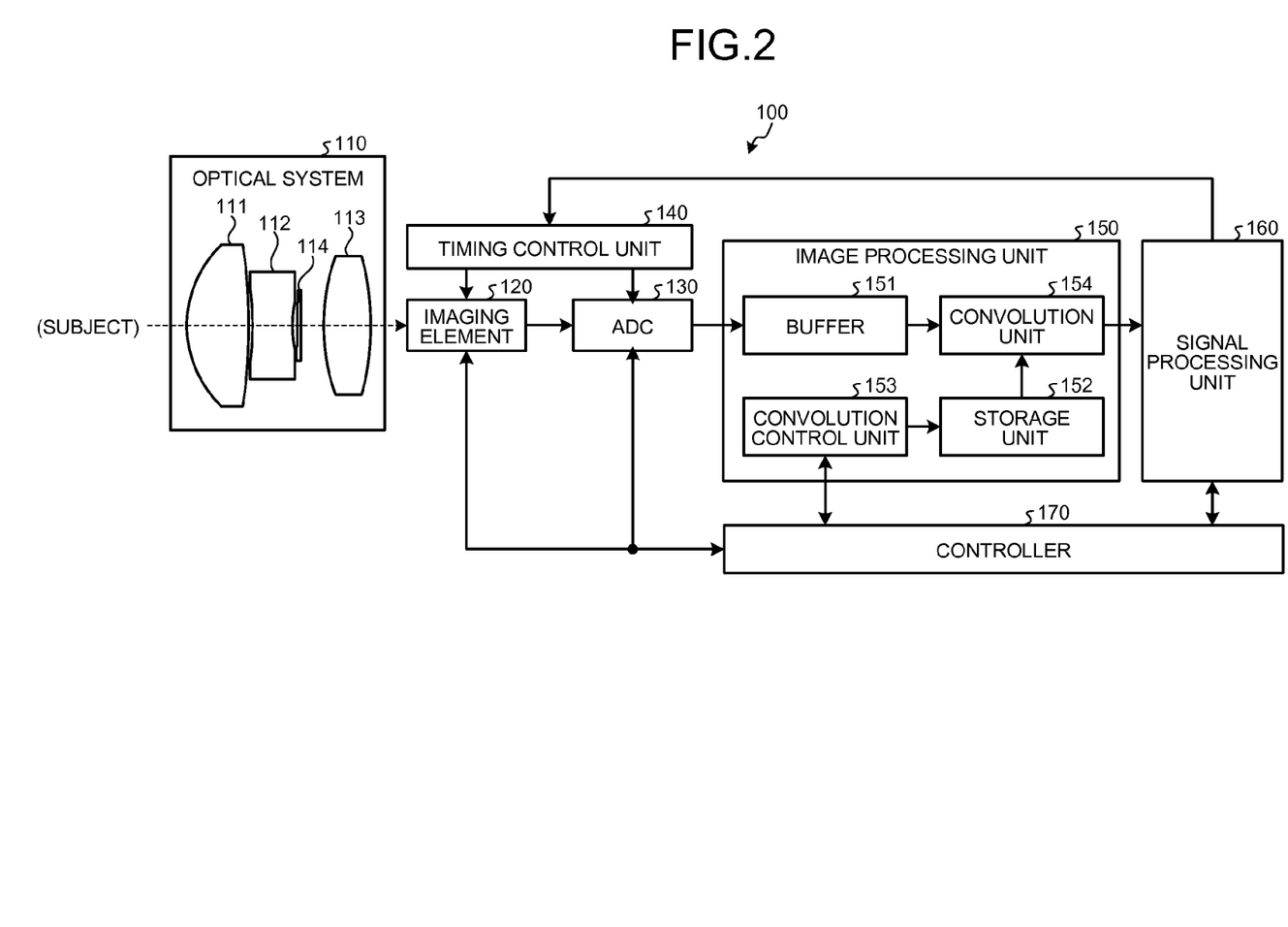
FIG. 2 is a block diagram illustrating an example of a configuration of an imaging apparatus according to a second embodiment.

First, the imaging apparatus according to the second embodiment will be described with reference to FIG. 2. FIG. 2 is a block diagram illustrating an example of a configuration of the imaging apparatus according to the second embodiment. An imaging apparatus 100 illustrated in FIG. 2 is, for example, a digital camera, a camera mounted on a mobile information terminal such as a mobile phone, a camera mounted on an image detection apparatus, an automatically-controlled industrial camera, or the like.

As illustrated in FIG. 2, the imaging apparatus 100 according to the second embodiment includes an optical system 110, an imaging element 120, an analog-to-digital converter (ADC) 130, a timing control unit 140, an image processing unit 150, a signal processing unit 160, and a controller 170.

The optical system 110 allows the light emitted from the subject, which is to be imaged, to be incident on the imaging element 120. More specifically, the optical system 110 includes lenses 111 to 113 and a phase plate 114. The lenses 111 and 112 refract the light emitted from the subject which is to be imaged.

The phase plate 114 is, for example, an optical wavefront coding element which disperses the light flux of the subject illuminated through the lenses 111 and 112 into three directions. Next, the light flux dispersed by the phase plate 114 is focused through the lens 113 on the imaging element 120. More specifically, the phase plate 114 focuses the light flux of the subject on the area, which is dispersed from an arbitrary position into three directions, of the light receiving surface of the imaging element 120.

Figure 3:
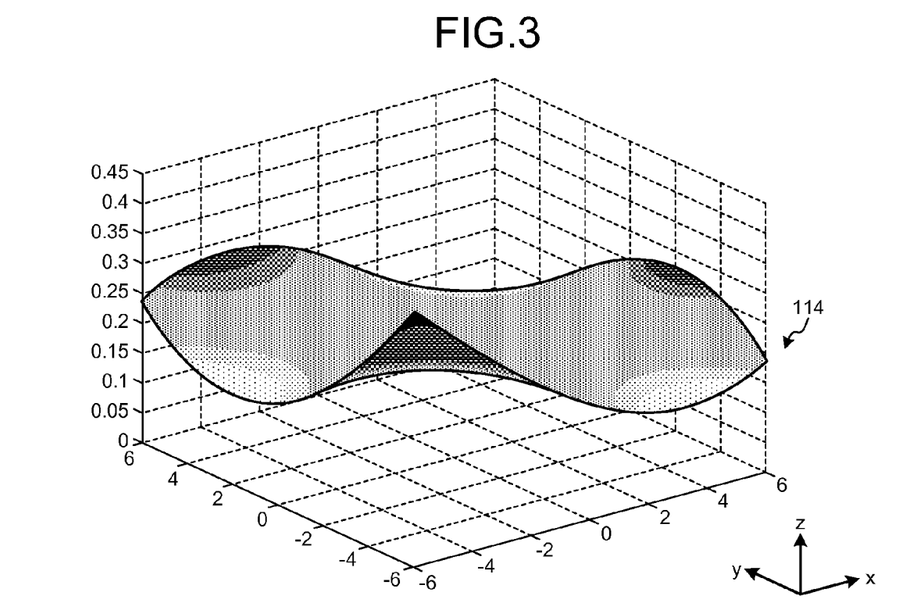
FIG. 3 is a diagram illustrating an example of a shape of a phase plate according to the second embodiment.
Figure 4:
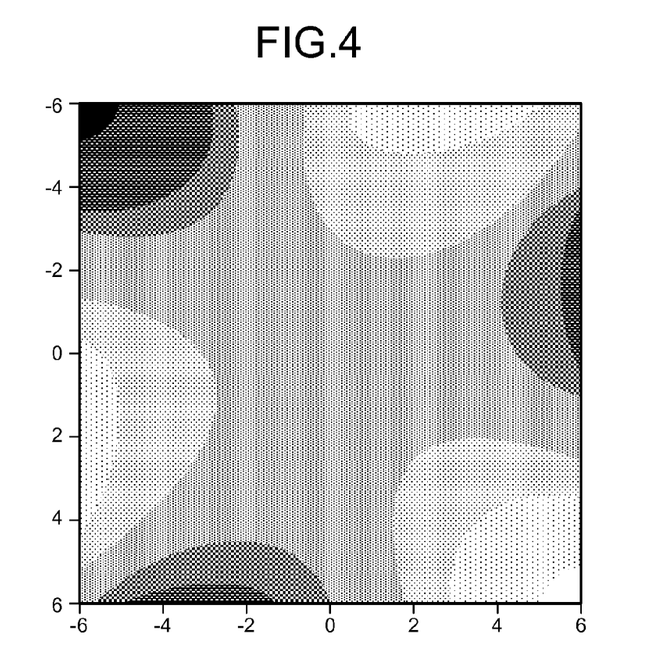
FIG. 4 is a diagram illustrating an example of a shape of a phase plate according to the second embodiment.

Now, the shape of the phase plate 114 will be described with reference to FIGS. 3 and 4. FIGS. 3 and 4 are diagrams illustrating an example of the shape of the phase plate 114 according to the second embodiment. The phase plate 114 illustrated in FIG. 3 is configured so that the XY plane of the phase plate 114 faces the lens 112 or the lens 113. In other words, the phase plate 114 is inserted into the optical system 110 so that the lens 112 or the lens 113 is disposed in the Z axis direction. In addition, in the example illustrated in FIG. 3, the lenses 111 and 112 are located in the upper portion of the figure, and the lens 113 or the imaging element 120 is located in the lower portion of the figure.

As illustrated in FIGS. 3 and 4, the phase plate 114 has a surface shape where three combination sets of a protruding convex portion and a recessed concave portion are formed. In the example illustrated in FIGS. 3 and 4, the phase plate 114 has a surface shape where three combination sets of a convex portion which protrudes in the direction where the lens 112 is located and a concave portion which is recessed in the direction where the lens 112 is located are formed in the circumference of the XY plane. In other words, the phase plate 114 has a shape where a convex portion which protrudes in the direction of approaching to the lens 112 and a convex portion which protrudes in the direction of separating from the lens 112 are alternately repeated to form three sets in the circumference of the XY plane. The shape of the phase plate 114 is expressed, for example, by the following Equation (8).

$$z = A(x^3 + x^2y + xy^2 + y^3) \tag{8}$$

In the above Equation (8), "A" indicates an arbitrary coefficient. The phase plate 114 having the shape expressed by the above Equation (8) has a phase distribution which is dispersed from an arbitrary position into three directions on the XY plane. More specifically, the phase distribution of the phase plate 114 is expressed, for example, by the following Equation (9).

$$P(x,y) = \exp(i(\alpha_1 x^3 + \alpha_2 x^2 y + \alpha_3 xy^2 + \alpha_4 y^3)) \tag{9}$$

$\alpha_1$, $\alpha_2$, $\alpha_3$, and $\alpha_4$ indicated in the above Equation (9) are arbitrary coefficients. For example, $\alpha_1$, $\alpha_2$, $\alpha_3$, and $\alpha_4$ are "0.0196," "−0.1363," "−0.0288," and "0.0373," respectively.

In the second embodiment, since the phase plate 114 has the shape illustrated in FIGS. 3 and 4 and the phase distribution exemplarily expressed by the above Equation (8), it is possible to disperse the light flux emitted from the subject into three directions.

Returning to FIG. 2, the imaging element 120 focuses the light flux incident from the optical system 110. More specifically, the imaging element 120 receives the light flux dispersed by the phase plate 114 through the lens 113 and forms an image. The imaging element 120 is, for example, a CCD, a CMOS, or the like. In addition, since the light flux is dispersed by the phase plate 114, the subject preimage obtained through the image formation of the imaging element 120 is a blur image in the state the focus thereof is deviated, which is called an intermediate image.

The ADC 130 converts the intermediate image as an analog signal input from the imaging element 120 into a digital signal and outputs the intermediate image as a converted digital signal to the image processing unit 150. The timing control unit 140 controls driving timing of the imaging element 120 or the ADC 130 in response to a command of the signal processing unit 160.

The image processing unit 150 applies a digital process to the intermediate image as the digital signal input from the ADC 130 to generate the subject image. More specifically, as illustrated in FIG. 2, the image processing unit 150 includes a buffer 151, a storage unit 152, a convolution control unit 153, and a convolution unit 154.

The buffer 151 stores the intermediate image as the digital signal input from the ADC 130. The storage unit 152 stores kernel data used for convolution determined by the PSF of the optical system 110. More specifically, the storage unit 152 stores the kernel data "$h_{inv}$" obtained through inverse Fourier transformation of the inverse filter "$H_{inv}$" of the OTF "G" which is a result of Fourier transformation of the PSF "g". For example, the storage unit 152 stores the kernel data "$h_{inv}$" in correspondence with an optical magnification ratio. In addition, for example, the storage unit 152 stores the kernel data "$h_{inv}$" in correspondence with information on the distance between the imaging apparatus 100 and the subject.

The convolution control unit 153 controls replacing the kernel data used for the convolution under the control of the controller 170. More specifically, the convolution control unit 153 selects the kernel data used for the convolution among the kernel data stored in the storage unit 152 based on information on, for example, exposure determined by the below-described controller 170 when setting exposure.

The convolution unit 154 performs convolution on the intermediate image as the digital signal stored in the buffer 151 based on the kernel data selected by the convolution control unit 153 to generate the subject image "f". For example, in the case where the intermediate image is denoted by "h" and the kernel data selected by the convolution control unit 153 is denoted by "$h_{inv}$", the convolution unit 154 performs the convolution expressed by the above Equation (7) to generate the subject image "f".

In addition, FIG. 2 illustrates an example where the convolution unit 154 performs the convolution on the digital signal of the intermediate image based on the kernel data stored in the storage unit 152 to generate the subject image. However, in the second embodiment, the image processing unit 150 may generate the subject image by performing a process other than the process of the aforementioned example.

For example, the storage unit 152 may store the inverse filter "$H_{inv}$" expressed in the above Equation (6) in correspondence with an optical magnification ratio or the like. Next, the convolution control unit 153 selects the inverse filter used for calculation among the inverse filters stored in the storage unit 152 based on, for example, information on exposure determined by the controller 170. Next, the convolution unit 154 performs the multiplication expressed by the above Equation (5) by using the inverse filter selected by the convolution control unit 153 and the intermediate image as the digital signal stored in the buffer 151. Next, the convolution unit 154 may perform inverse Fourier transformation on a result of the multiplication to generate the subject image "f".

The signal processing unit 160 performs a color interpolation process, a white balance process, a YCbCr conversion process, or the like on the subject image generated by the image processing unit 150. In addition, the signal processing unit 160 stores the subject image on which the color interpolation process or the like is performed in a memory (not illustrated) or the like or displays the subject image on a display unit (not illustrated). In addition, the signal processing unit 160 is, for example, a digital signal processor (DSP).

The controller 170 controls the imaging apparatus 100 overall. More specifically, the controller 170 controls exposure for providing light to the imaging element 120 or controls operations of the ADC 130, the image processing unit 150, and the signal processing unit 160 according to details of manipulation input to a manipulation unit (not illustrated) or the like.

Figure 5:
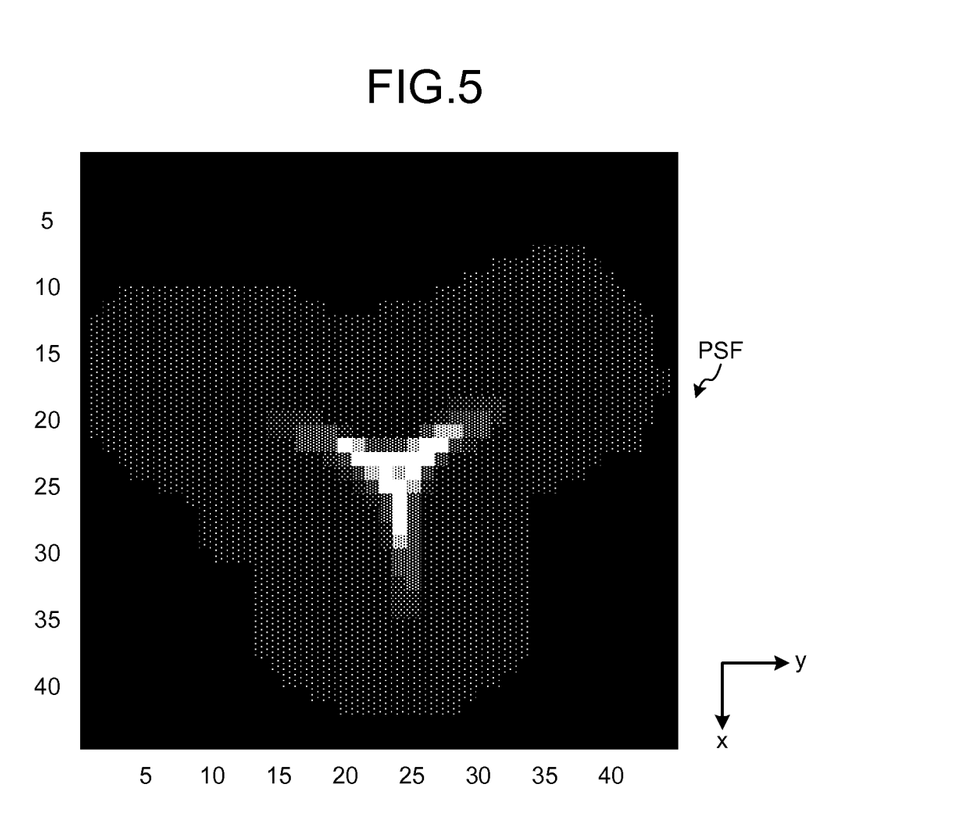
FIG. 5 is a diagram illustrating an example of a PSF of an optical system according to the second embodiment.
Figure 6:
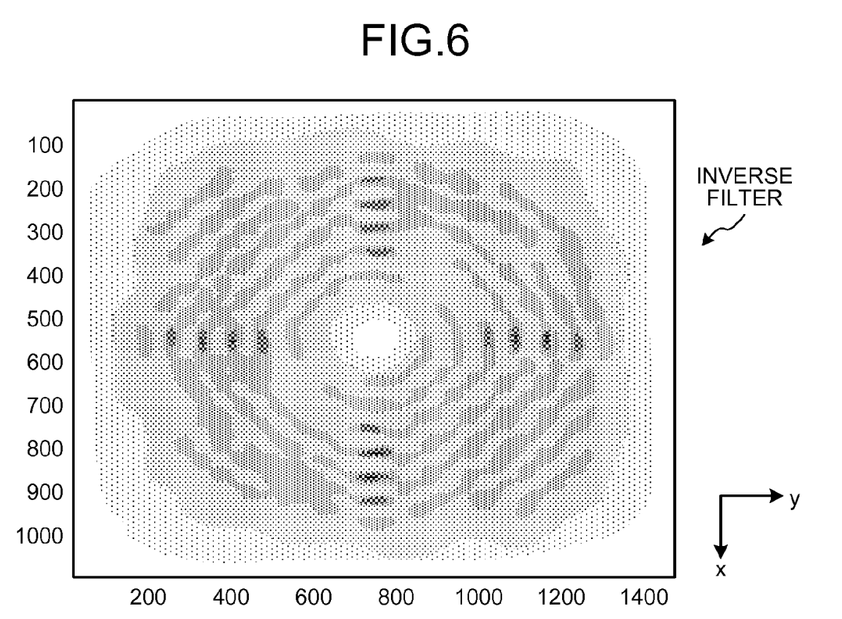
FIG. 6 is a diagram illustrating an example of an inverse filter according to the second embodiment.
Figure 7:
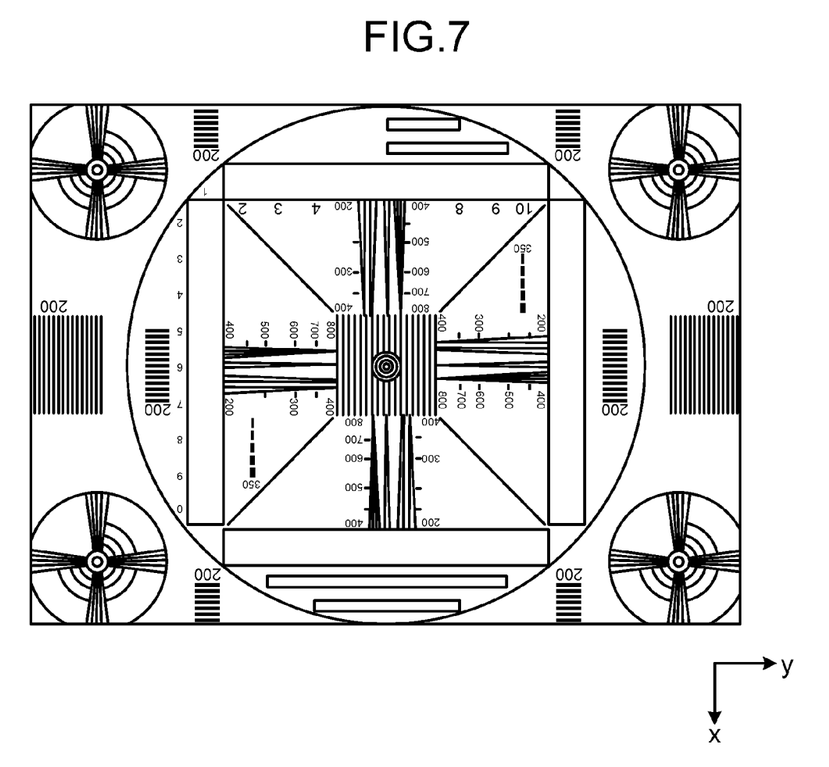
FIG. 7 is a diagram illustrating an example of a subject image generated by the imaging apparatus according to the second embodiment.

Now, the subject image generated by the image processing unit 150 illustrated in FIG. 2 will be described with reference to FIGS. 5 to 7. FIG. 5 is a diagram illustrating an example of the PSF of the optical system 110 according to the second embodiment. FIG. 6 is a diagram illustrating an example of the inverse filter according to the second embodiment. FIG. 7 is a diagram illustrating an example of the subject image generated by the imaging apparatus 100 according to the second embodiment.

As illustrated in the example of FIG. 5, the PSF of the optical system 110 is dispersed into three directions. In comparison with the MTF which is a result of Fourier transformation on the PSF dispersed in two directions perpendicular to each other, the MTF which is a result of Fourier transformation on the PSF described above has symmetry, so that the imaging apparatus has a small area where the MTF becomes a value close to "0". As a result, as illustrated in the example of FIG. 6, the inverse filter "$H_{inv}$" used in the imaging apparatus 100 according to the second embodiment has symmetry. Therefore, in comparison with the example illustrated in FIG. 14, the inverse filter "$H_{inv}$" used for the imaging apparatus 100 according to the second embodiment has a small area which is easily affected by noise.

Therefore, there is a low possibility that a ghost occurs in the subject image generated by the convolution unit 154. FIG. 7 illustrates an example of the subject image generated by the convolution unit 154. As illustrated in FIG. 7, in comparison with the subject image illustrated in FIG. 15, no ghost occurs in the subject image generated by the convolution unit 154. Accordingly, in the imaging apparatus 100 according to the second embodiment, it is possible to generate the subject image at high accuracy.

Characteristic of Depth of Field

Figure 8:
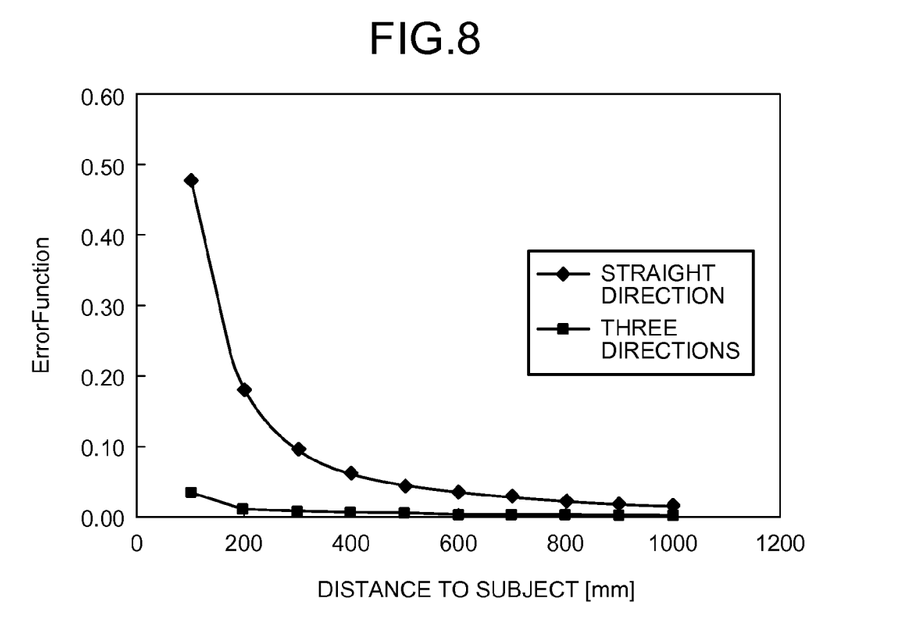
FIG. 8 is a diagram illustrating a characteristic of depth of field of the imaging apparatus according to the second embodiment.

Next, a characteristic of depth of field of the imaging apparatus 100 according to the second embodiment will be described with reference to FIG. 8. FIG. 8 is a diagram illustrating the characteristic of depth of field of the imaging apparatus 100 according to the second embodiment. Herein, the characteristic of depth of field of the imaging apparatus 100 according to the second embodiment will be described in comparison with the imaging apparatus where the PSF is dispersed into two directions.

In the example illustrated in FIG. 8, the distance between the imaging apparatus and the subject is changed into "z1" and "z2", and a square of a difference in OTF is used as an evaluation function. More specifically, the evaluation function (or error function) EF is obtained by using the following Equation (10).

$$Ef = \Sigma\Sigma(OTF(z)-OTF(z\infty))^2/\Sigma\Sigma(OTF(z\infty))^2 \quad (10)$$

As illustrated in the example of FIG. 8, in comparison with a PSF dispersed into two directions perpendicular to each other, in a PSF dispersed into three directions such as the PSF of the optical system 110 according to the second embodiment, a difference in MTF according to a distance to a subject is smaller. In other words, in comparison with the imaging apparatus where the PSF is dispersed into two directions, in the imaging apparatus 100 according to the second embodiment, it is possible to more improve a characteristic of depth of field.

Figure 9:
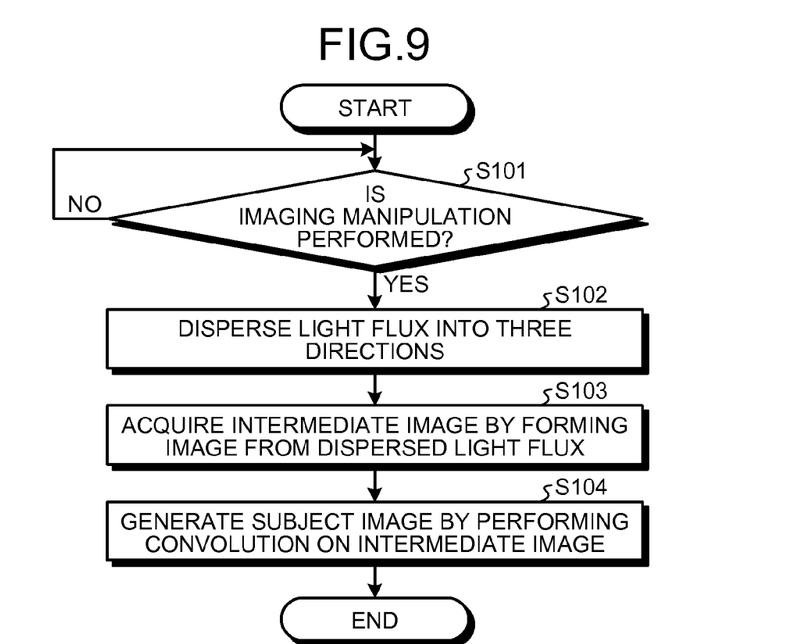
FIG. 9 is a flowchart illustrating a procedure of an imaging process of the imaging apparatus according to the second embodiment.

Next, a procedure of an imaging process of the imaging apparatus 100 according to the second embodiment will be described with reference to FIG. 9. FIG. 9 is a flowchart illustrating a procedure of an imaging process of the imaging apparatus 100 according to the second embodiment.

As illustrated in FIG. 9, in the case where a user or the like performs imaging manipulation of the imaging apparatus 100 (Yes in Step S101), the controller 170 performs exposure control on the imaging element 120 and simultaneously controls operations of the ADC 130, the image processing unit 150, and the signal processing unit 160.

Next, the phase plate 114 disperses the light flux of the subject, which is illuminated through the lenses 111 and 112, into three directions (Step S102). Next, the light flux dispersed by the phase plate 114 is focused on the imaging element 120 through the lens 113 (Step S103). Therefore, the imaging apparatus 100 may obtain the intermediate image corresponding to the subject image which is to be imaged. Next, the image processing unit 150 performs convolution on the intermediate image as a digital signal based on the kernel data to generate the subject image (Step S104).

Effect of Second Embodiment

As described above, since the imaging apparatus 100 according to the second embodiment has the optical system 110 where the PSF is dispersed into three directions, the imaging apparatus has a small area where the MTF becomes a value close to "0" during a digital process. In other words, in the imaging apparatus 100 according to the second embodiment, since the area where the inverse filter becomes a large value is small, it is possible to reduce the area which is affected by noise. As a result, it is possible to prevent a ghost from occurring in the subject image. Therefore, in the imaging apparatus 100 according to the second embodiment, it is possible to generate the subject image at high accuracy.

In addition, since the phase plate 114 of the imaging apparatus 100 according to the second embodiment has the shape illustrated in FIGS. 3 and 4, it is possible to disperse the light flux emitted from the subject into three directions.

In addition, since the phase plate 114 of the imaging apparatus 100 according to the second embodiment has the phase distribution expressed by the above Equation (9), it is possible to disperse the light flux emitted from the subject into three directions.

In addition, in the second embodiment, the phase plate 114 which disperses the light flux emitted from the subject into three directions is exemplified. However, the phase plate 114 may disperse the light flux emitted from the subject into four or more directions. This configuration may be implemented, for example, by forming the shape of the surface of the phase plate 114 where four or more combination sets of a convex portion which protrudes in the direction where the lens 112 is located and a concave portion which is recessed in the direction where the lens 112 is located are formed in the circumference of the XY plane.

In addition, in the second embodiment, a case is exemplified where the phase plate 114 has the shape illustrated in FIGS. 3 and 4 to disperse the light flux emitted from the subject into three directions. However, the phase plate 114 may be any element which deforms a wavefront. For example, the phase plate 114 may be an optical element such as a refractive-index-distributed wavefront coding lens where the refractive index is changed.

In addition, in the second embodiment, a case is exemplified where the optical system 110 includes the phase plate 114. However, the dispersion of the light flux emitted from the subject into three directions may be implemented by integrating the lens 111, the lens 112, and the like of the optical system 110 with the phase plate 114. For example, the dispersion of the light flux emitted from the subject into three directions may be implemented by using wavefront coding hybrid lens or the like, of which the refractive index is changed by processing a lens surface, as a substitute for the lens 112.

According to an aspect of an imaging apparatus according to the present application, it is possible to generate a subject image at high accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An imaging apparatus comprising:
   an optical wavefront coding element that performs a dispersion of a light flux emitted from a subject into three or more directions;
   an imaging element that receives the light flux dispersed by the optical wavefront coding element to acquire a subject preimage; and
   a generation unit that generates an image of the subject by applying a process corresponding to the dispersion to the subject preimage,
   wherein the optical wavefront coding element has a phase distribution which is dispersed from an arbitrary position into three or more directions on a light receiving surface of the imaging element that receives the light flux dispersed by the optical wavefront coding element,
   wherein the three or more directions on the light receiving surface of the imaging element are not perpendicular to each other.

2. The imaging apparatus according to claim 1, wherein a shape of a surface of the optical wavefront coding element is a shape where three or more combination sets of a protruding convex portion and a recessed concave portion are formed in a circumference of a light receiving surface which receives the light flux emitted from the subject.

3. The imaging apparatus according to claim 1,
   wherein, the optical wavefront coding element has a phase distribution P (x, y) expressed by the following Equation:

$$P(x,y)=\exp(i(\alpha_1 x^3+\alpha_2 x^2 y+\alpha_3 xy^2+\alpha_4 y^3))$$

where, (x, y) is a coordinate on the light receiving surface of the imaging element that receives the light flux dispersed by the optical wavefront coding element, and $\alpha_1$, $\alpha_2$, $\alpha_3$, and $\alpha_4$ are arbitrary values.

4. The imaging apparatus according to claim 1, wherein the generation unit generates the image of the subject by applying a digital process to the subject preimage obtained by image formation of the imaging element based on an inverse filter of an optical transfer function which is obtained by performing Fourier transformation on a point spread function of the optical system including the optical wavefront coding element.

5. The imaging apparatus according to claim 1, wherein the generation unit generates the image of the subject by performing convolution on the subject preimage obtained by image formation of the imaging element based on an inverse kernel which is a result of inverse Fourier transformation on an inverse filter of an optical transfer function which is obtained by performing Fourier transformation on a point spread function of the optical system including the optical wavefront coding element.

6. An imaging method for an imaging apparatus imaging a subject, the imaging method comprising:

performing, by an optical wavefront coding element, a dispersion of a light flux emitted from the subject into three or more directions;

focusing, by an imaging element, the dispersed light flux to acquire a subject preimage; and generating an image of the subject by applying a process corresponding to the dispersion to the subject preimage, wherein the optical wavefront coding element has a phase distribution which is dispersed from an arbitrary position into three or more directions on a light receiving surface of the imaging element that receives the light flux dispersed by the optical wavefront coding element, wherein the three or more directions on the light receiving surface of the imaging element are not perpendicular to each other.

* * * * *